(12) United States Patent
Sun et al.

(10) Patent No.: US 9,436,655 B2
(45) Date of Patent: Sep. 6, 2016

(54) ARCHITECTURE FOR VECTOR MEMORY ARRAY TRANSPOSITION USING A BLOCK TRANSPOSITION ACCELERATOR

(71) Applicant: ST-ERICSSON SA, EN LIQUIDATION, Plan-les-Ouates (CH)

(72) Inventors: Yanmeng Sun, Shanghai (CN); Liangliang Hu, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 15/049,255

(22) Filed: Feb. 22, 2016

(65) Prior Publication Data

US 2016/0170936 A1 Jun. 16, 2016

Related U.S. Application Data

(62) Division of application No. 12/400,572, filed on Mar. 9, 2009, now Pat. No. 9,268,746.

(60) Provisional application No. 61/034,933, filed on Mar. 7, 2008.

(51) Int. Cl.
*G06F 17/16* (2006.01)
*G06F 9/30* (2006.01)
*G06F 7/78* (2006.01)
*G06F 15/80* (2006.01)

(52) U.S. Cl.
CPC ........... *G06F 15/8061* (2013.01); *G06F 7/785* (2013.01); *G06F 9/30036* (2013.01); *G06F 9/30043* (2013.01); *G06F 15/8076* (2013.01); *G06F 17/16* (2013.01)

(58) Field of Classification Search
None
See application file for complete search history.

*Primary Examiner* — Zachary K Huson
*Assistant Examiner* — Dayton Lewis-Taylor
(74) *Attorney, Agent, or Firm* — Howison & Arnott, LLP

(57) ABSTRACT

A system and method for vector memory array transposition. The system includes a vector memory, a block transposition accelerator, and an address controller. The vector memory stores a vector memory array. The block transposition accelerator reads a vector of a block of data within the vector memory array. The block transposition accelerator also writes a transposition of the vector of the block of data to the vector memory. The address controller determines a vector access order, and the block transposition accelerator accesses the vector of the block of data within the vector memory array according to the vector access order.

12 Claims, 9 Drawing Sheets

ARCHITECTURE FOR VECTOR MEMORY ARRAY TRANSPOSITION USING A BLOCK TRANSPOSITION ACCELERATOR

CROSS-REFERENCE TO RELATED APPLICATIONS

This application is a divisional application of U.S. patent application Ser. No. 12/400,572, filed Mar. 9, 2009, entitled ARCHITECTURE FOR VECTOR MEMORY ARRAY TRANSPOSITION USING A BLOCK TRANSPOSITION ACCELERATOR, now U.S. Pat. No. 9,268,746, issued on Feb. 23, 2016, which is claims benefit from U.S. Provisional Application No. 61/034,933, filed Mar. 7, 2008, entitled ARCHITECTURE FOR VECTOR MEMORY ARRAY TRANSPOSITION USING A BLOCK TRANSPOSITION ACCELERATOR, the specifications of which are incorporated herein in their entirety.

TECHNICAL FIELD

This application relates generally to matrix calculations and, more particularly, to memory array transpositions.

BACKGROUND

Matrix calculations are becoming more and more popular in various electrical and computer systems. Matrix calculations are used in many systems with concurrent multiple data paths. For example, matrix calculations are used in conventional equalizers in the Universal Mobile Telecommunications System (UMTS) High-Speed Downlink Packet Access (HSDPA). Matrix calculations are also used in conventional joint detection receivers in Time Division-Synchronous Code Division Multiple Access (TD-SCDMA), conventional Multiple-Input and Multiple-Output (MIMO) technologies, and other conventional technologies. The algorithms implemented in these technologies can be easily expressed in matrix format and implemented by a series of matrix operations, including matrix inversion, multiplication, conjugation and transposition, and so forth.

In conventional architectures, whether implemented as pure hardware or programmable architectures, matrix operations are conventionally realized by loop structures based on scalar operations. The scalar processing for these matrix operations usually incurs tremendous computational load since each matrix element is processed in series. To overcome these computational loads, vector processing architectures are implemented to accelerate the computation.

The basic principle of vector processing is that a set of identical operations are executed in parallel. To avoid the bottleneck of data accessing, the vector architecture usually has vector memory, as well, which is organized in lines instead of basic memory units. Organizing the vector memory in lines does not mean that conventional scalar data accessing cannot be supported.

FIG. 1A illustrates a conventional vector processing architecture 10. In particular, FIG. 1A illustrates the basic principles of vector processing using a vector memory 12. The depicted vector processing architecture 10 includes the vector memory 12 and a vector processor 14. The vector memory 12 is subdivided into several lines 16. Each line 16 has a width, L, which is the same as the instinctive vector width, L, of the whole vector processing architecture 10. Arithmetic and logic operations implemented by the vector processing architecture 10 are based on the instinctive vector width, L. Similarly, memory accessing operations are also based on the instinctive vector width, L.

The vector processing architecture 10 also accommodates operations using vectors which have a vector width that is different from the instinctive vector width, L. For example, the vector processing architecture 10 may implement operations for a vector with a width, K, which is less than the instinctive vector width, L, (i.e., K<L) by masking or padding the elements greater than K (i.e., the L-K elements). Also, in accessing data on the vector memory 12, the beginning address of a vector can be arbitrary. In general, within the vector memory 12, a "vector" means L elements stored in successive memory addresses. This can be stated as:

$$V = v(s), v(s+1), \ldots, v(s+L-1),$$

where V is a vector, and s is the starting address of the vector. This configuration is consistent with conventional vector architectures within the state of art of the circuit design.

The matrix transposition is one of the most frequently used operations in many vector algorithms. For a given matrix:

$$A = \begin{bmatrix} a_{1,1} & a_{1,2} & \ldots & a_{1,n} \\ a_{2,1} & a_{2,2} & \ldots & a_{2,n} \\ \vdots & & & \\ a_{m,1} & a_{m,2} & \ldots & a_{m,n} \end{bmatrix} m/n,$$

the matrix transposition, in the mathematical description, is:

$$A^T = \begin{bmatrix} a_{1,1} & a_{1,2} & \ldots & a_{n,1} \\ a_{2,1} & a_{2,2} & \ldots & a_{n,2} \\ \vdots & & & \\ a_{1,n} & a_{2,n} & \ldots & a_{n,m} \end{bmatrix} n \backslash m$$

Besides the matrix transposition itself, some other matrix operations include the matrix transposition as a sub-operation, as well. For example, the Hermit operation, $A^H$, which is widely used in many algorithms, uses matrix element conjugation and matrix transposition.

The matrix transposition is an operation that is typically more difficult to implement in vector processing architectures than in scalar processing architectures. From the original and transposed matrices shown above, the only change after the transposition is the arrangement of data elements in the matrix. In contrast to many other matrix operations, the main operations of the matrix transposition are memory array re-organizing, instead of arithmetic and logic operations. Hence, the matrix transposition operation described above is also referred to as a memory array transposition.

In many instances, the execution efficiency of a memory array transposition operation in the vector processing architecture 10 is lower than other kinds of operations. In the memory array transposition operation, the adjacent elements are scattered after the operation execution. In other words, there is not a direct correlation between the integral vector output and adjacent elements in the original memory configuration. Thus, the parallel processing advantages of the vector processing architecture 10 are not efficiently used during the data element relocation operations.

The operations for the memory array transposition in the vector processing architecture 10 normally include three operations for each line within the vector memory 12. In general, these operations include fetching an integral vector, relocating all of the elements inside the integral vector, and moving the elements to target addresses. The operations of relocating and moving the elements are usually iterated as a loop to achieve the transposition.

In more detail, a simple vector reading operation is implemented to load the data vector into a vector register 18 of the vector processor 14. This is a normal operation in the vector processing architecture 10. The target memory address of each element is then determined, and the address, S, is decomposed to 2 parts—a basic address and an offset, as follows:

$$S = S_{basic\_address} + S_{offset}$$

The basic address, $S_{basic\_address}$, is the maximum number that is an integer multiple of the instinctive vector width, L. The offset, $S_{offset}$, is the number of remaining elements. Hence, $0 \le S_{offset} < L$. The data element relocation operation is based on the address offset, $S_{offset}$. Since $0 \le S_{offset} < L$, the input and output of the relocating operation are both vectors.

In the element moving operation, each data element in the output vector element relocating operation is moved to a target address. Due to the data relocation in the previous operation, only the data element for the corresponding basic address, $S_{basic\_address}$, is moved. Usually, the basic addresses, $S_{basic\_address}$, for various data elements are different. This means that the target addresses of these data elements are located in different vectors. Therefore, a single execution of the data moving operation only affects a single element, or possibly a few elements. Often, multiple loops of the vector moving operation are implemented for a single vector.

FIG. 1B illustrates a data element arrangement 20 in various stages of the memory array transposition operations. In particular, FIG. 1B illustrates an output vector memory 22 using the lines 16 shown in the vector memory 12 of FIG. 1A as input for the memory array transposition operations. In particular, several of the individual lines 16, or vectors, are shown, including a first vector 24, a second vector 26, and a last vector 28. The first vector 24 is one of the rows of the output vector memory 22. After the matrix transposition, the first vector 24 becomes the first column of the transposed matrix. Similarly, the second vector 26 becomes the second column of the transposed matrix, and the last vector 26 becomes the last column of the transposed matrix. In conventional vector processing, which deals with row vectors, the elements of each vector are stored, one by one, in a target memory in order to rearrange the elements into a column. This can be achieved by two typical vector processing operations: shift left and masked store. The shift left operation circularly shifts all elements of the vector 30 to the next position on the left. The masked store operation stores one or more elements to the target memory while not storing the remaining elements at the same time. After each shift left operation, the target element is put into the left-most position and then, using the masked store operation, is stored to the target memory. As one example, if there are L=8 elements in a vector, then it would take eight cycles of shift left and masked store operations to transpose the vector from a row to a column.

The execution efficiency of the process shown in FIG. 1B and described above is not high in most cases, even though the instructions are executed in vector format. As described above, only a limited number of elements (e.g., one or a few) are moved with each cycle of the vector instructions.

There are some particular cases which illustrate additional difficulties with conventional memory array transpositions. Sometimes, the dimensions of a matrix are not an integer multiple of the instinctive vector width, L. In this case, the lines of the matrix are not aligned in the vector memory 12. FIG. 2 illustrates a memory array transposition 40 in which the dimensions of a matrix 42 are not an integer multiple of the instinctive vector width, L. In the illustrated example, the instinctive vector width is eight elements, but the matrix width is 10 elements (e.g., elements $e_{11}$ through $e_{1a}$). Such an unaligned vector memory layout 44 adds more complication for the address decomposition in the relocating and moving operations described above.

Given the difficulties of using vector processing methods for memory array transpositions, scalar methods are often used to simplify the programming and processing parameters. In other words, scalar operations may be used exclusively for relocating elements in a memory array transposition. Using a conventional scalar method, the typical execution can be implemented according to the following pseudo code:

```
j=0
Loop m
    i=0
    Loop n
        Read (temp, ptr_s++)
        Ptr_t=j*m+i
        Write (temp, ptr_t)
        i++
    End Loop
    i++
End Loop
j++
End Loop
```

The pseudo code program presented above uses two nested loops (i.e., loops m and n). The loop body is simple for each of these nested loops. Given the nested loops, the overall process repeats for m×n times. During each loop, at least three address index update operations, one scalar read operation, and one scalar write operation are implemented. This facilitates a high processing load for the scalar method, especially when the matrix dimensions are large, since the number of element in the matrix is in square proportion to the dimensions.

To compare the conventional vector and scalar methods, an example can be given for both conventional methods. Assuming an instinctive vector width of 16 and matrix size of 256×256, and assuming a proper pipeline is made during the read and store operations (i.e., ignoring the delay of the read and store operations), the 256×256 matrix transposition consumes 204,800 cycles for vector processing compared to 196,680 cycles for scalar processing. If the delay of the read and store operations is considered, the number of cycles consumed for vector processing would be even higher.

SUMMARY

Embodiments of a system are described. In one embodiment, the system is a system for vector memory array transposition. An embodiment of the system includes a vector memory, a block transposition accelerator, and an address controller. The vector memory stores a vector memory array. The block transposition accelerator reads a vector of a block of data within the vector memory array. The block transposition accelerator also writes a transposition of the vector of the block of data to the vector memory.

The address controller determines a vector access order, and the block transposition accelerator accesses the vector of the block of data within the vector memory array according to the vector access order. Other embodiments of the system are also described.

Embodiments of a method are also described. In one embodiment, the method is a method for transposing a vector memory array. An embodiment of the method includes reading a plurality of vectors of a block of data within the vector memory array stored in a vector memory. The method also includes shifting the plurality of vectors of the block of data through a plurality of registers. The plurality of vectors of the block of data are shifted along a first dimension of the plurality of registers. The method also includes outputting a plurality of transposed vectors of the block of data from the plurality of registers. The plurality of transposed vectors are based on the plurality of vectors of the block of data read into the plurality of registers. The plurality of transposed vectors are written out of the plurality of registers along a second dimension of the plurality of registers. Other embodiments of the method are also described.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 3 through 9, discussed below, and the various embodiments used to describe the principles of this disclosure are by way of illustration only and should not be construed in any way to limit the scope of the disclosure.

While many embodiments are described herein, at least some of the described embodiments facilitate an architecture for vector memory array transposition. In some embodiments of the architecture, scattered elements relocation is converted into a series of regular operations by a pair of block transposition accelerators and an address controller (refer to FIG. 3). In the block transposition accelerators, a particular structure may be utilized to transpose memory blocks with high efficiency. During the memory array transposition, the block transposition accelerators work successively as a pair in complementary phases on neighboring blocks. In some embodiments, this can reduce processing time by about half, more or less, compared to conventional techniques. In some embodiments, virtual segments may be added onto the border blocks of a vector memory array to facilitate the memory array transposition of a vector memory array with arbitrary dimensions.

Additionally, embodiments of the proposed architecture implement the block transposition accelerators in conjunction with a conventional vector memory. This combination may expedite the execution of regular batch operations in an entire memory array transposition. In some embodiments, in order to utilize the block transposition accelerators, the data array in the vector memory is partitioned into a set of blocks with regular size, which are individually suitable for processing by the block transposition accelerators.

In accordance with mathematical theory, an entire matrix transposition can be equivalently realized by a set of block matrix transposition operations, as follows:

$$A = \begin{bmatrix} B & C \\ D & E \end{bmatrix}$$

$$A^T = \begin{bmatrix} B^T & D^T \\ C^T & E^T \end{bmatrix}.$$

Thus, it is feasible to decompose an entire memory array transposition into a set of regular block operations within embodiments of the block transposition accelerators.

Figure 1A:
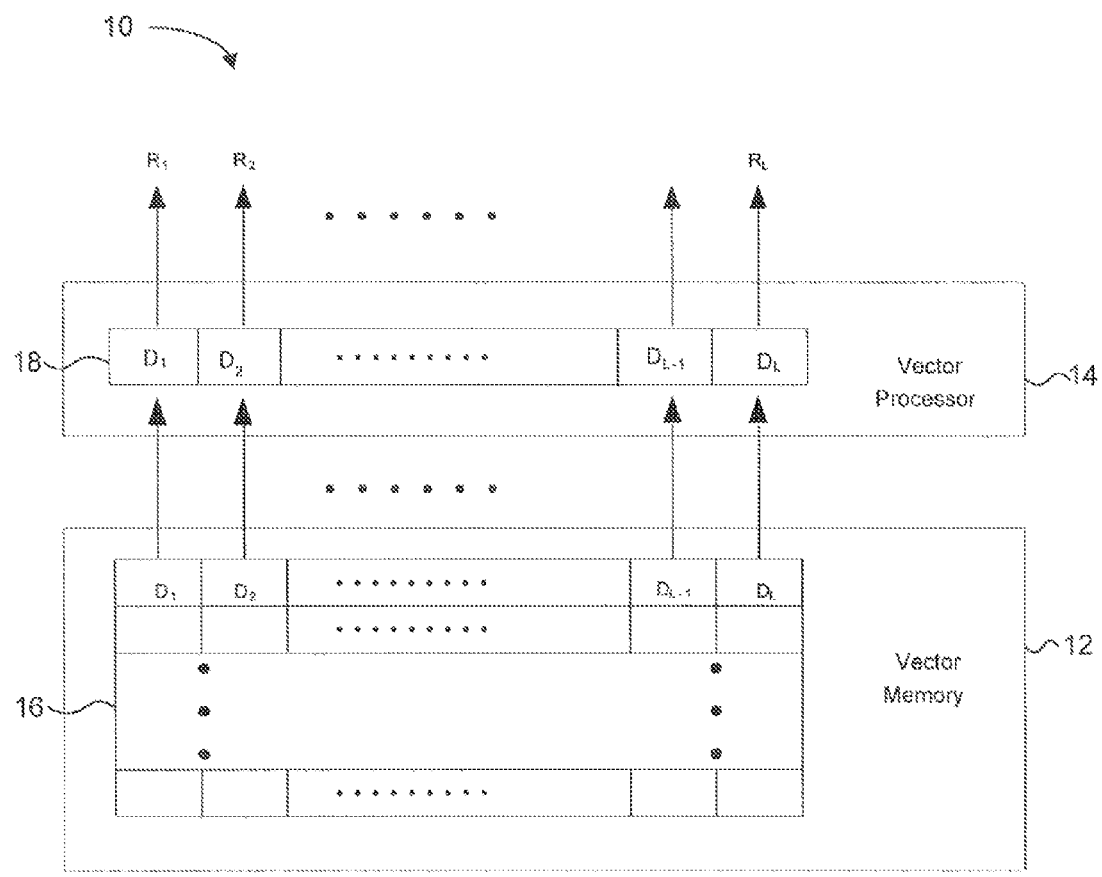
FIG. 1A illustrates a conventional vector processing architecture.
Figure 1B:
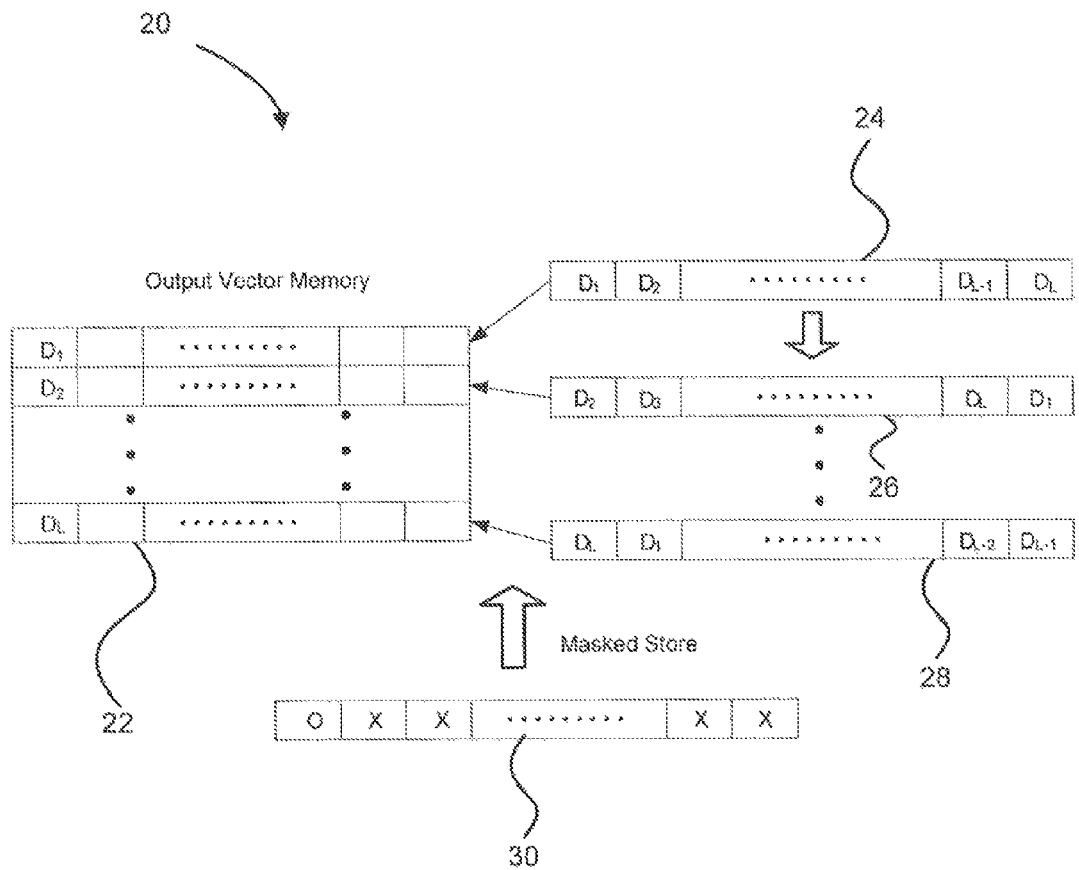
FIG. 1B illustrates a data element arrangement in various stages of memory array transposition operations.
Figure 2:
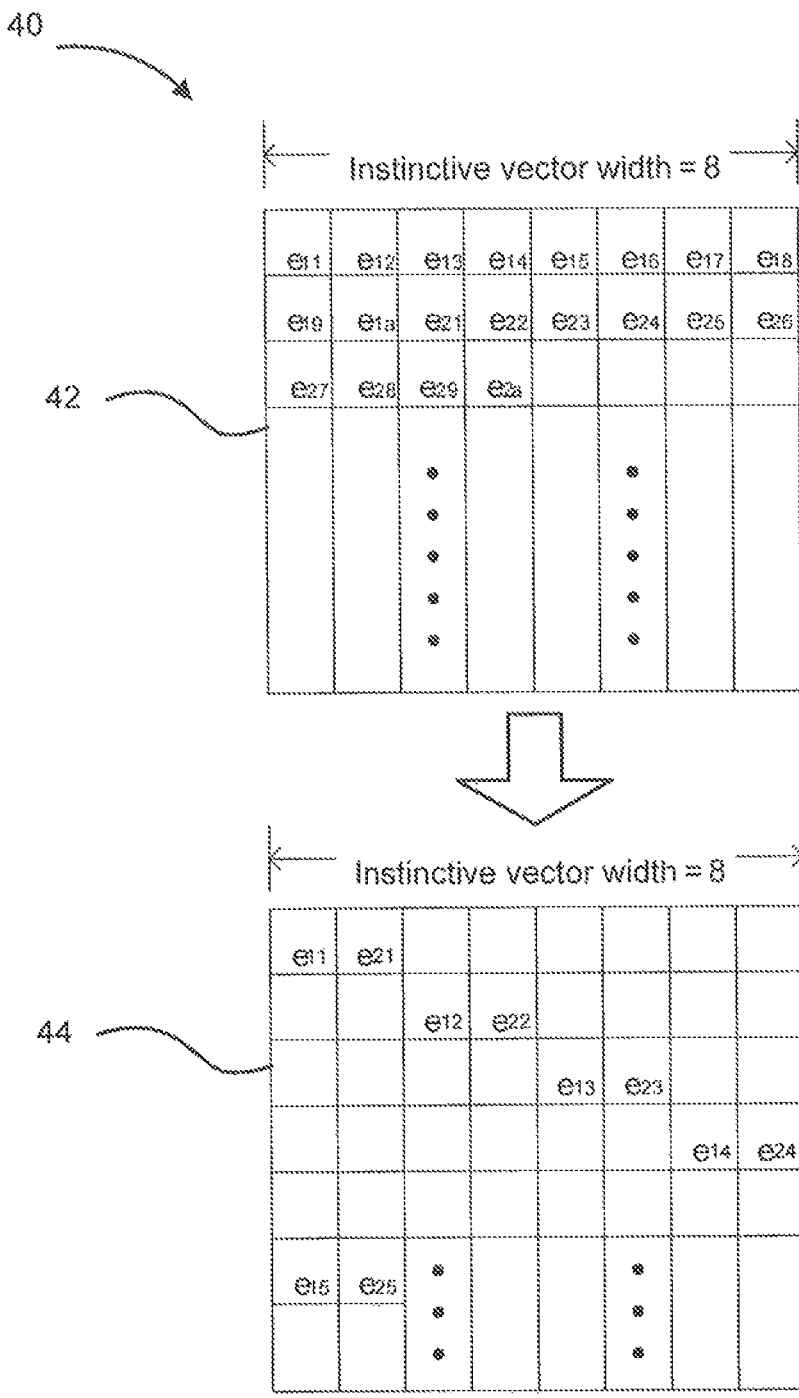
FIG. 2 illustrates a memory array transposition in which the dimensions of the matrix are not an integer multiple of the instinctive vector width, L.
Figure 3:
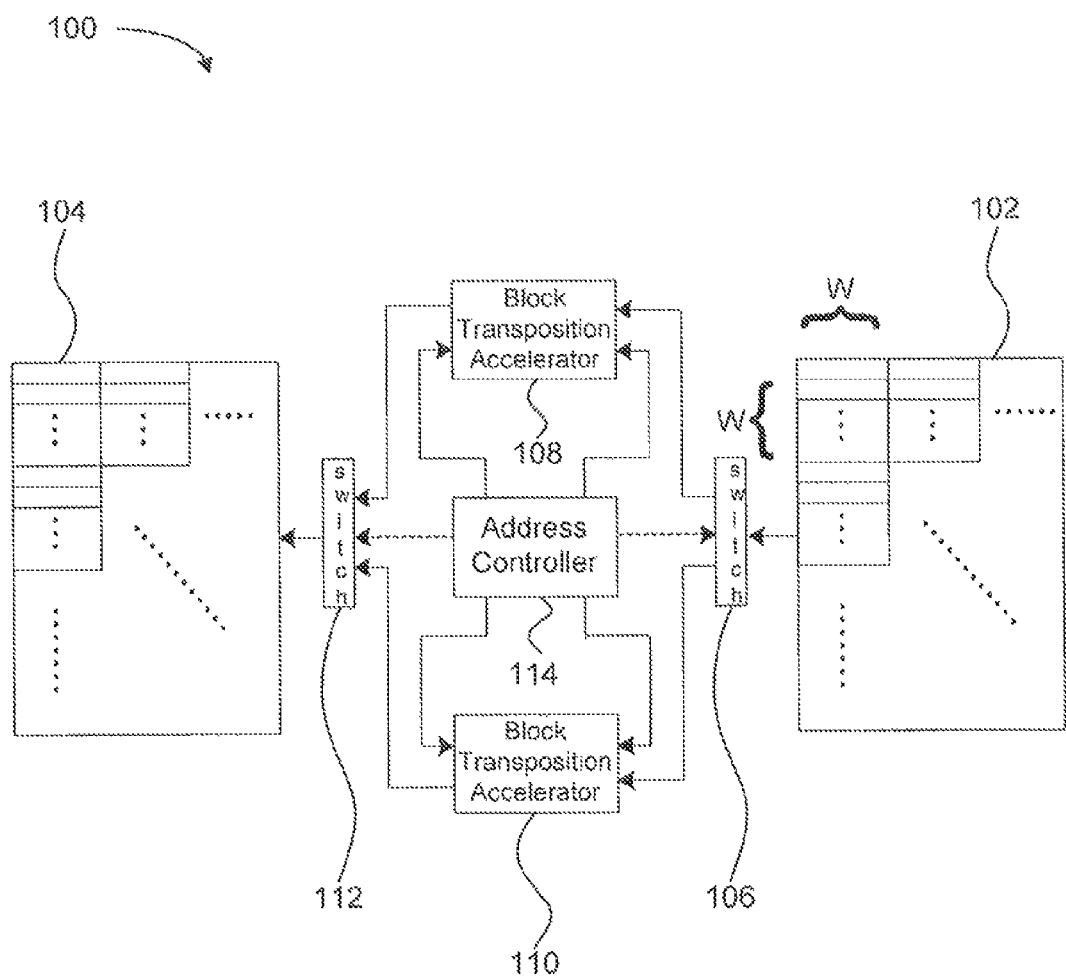
FIG. 3 depicts a schematic block diagram of one embodiment of a vector transposition architecture.

FIG. 3 depicts a schematic block diagram of one embodiment of a vector transposition architecture 100. The illustrated vector transposition architecture 100 includes an input vector memory 102, an output vector memory 104, a vector input switch 106, a pair of block transposition accelerators 108 and 110, a vector output switch 112, and an address controller 114. Although the depicted vector transposition architecture 100 includes several functional blocks described herein, other embodiments of the vector transposition architecture 100 may include fewer or more functional blocks to implement more or less functionality.

In some embodiments, the input vector memory 102 and the output vector memory 104 are separate memory devices. Alternatively, the input vector memory 102 and the output vector memory 104 may be overlapping or non-overlapping portions of the same memory device. In some embodiments, the vector memory is a conventional vector memory. References herein to a vector memory, generally, are merely representative of a variety of memory configurations for the input vector memory 102 and the output vector memory 104.

In general, the input vector memory 102 stores a vector memory array. The input vector memory 102 may subdivide the vector memory array into a plurality of block matrices, or vector memory blocks. The size of each vector memory block may be compatible for processing by the block transposition accelerators 108 and 110. For example, if the block transposition accelerators 108 and 110 are capable of processing a 16×16 vector memory block, then the vector memory array within the input vector memory 102 may be subdivided into vector memory blocks having dimensions of 16×16 or less. For convenience, the input vector memory 102 is described herein as subdividing the vector memory array into vector memory blocks having dimensions of W×W, where W represents the number of rows and columns within each vector memory block. In one embodiment, all of the vector memory blocks have a uniform block size. Alternatively, the vector memory blocks may have different block sizes.

In one embodiment, the vector input switch 106 is a simple switch circuit under the control of the address controller 114. The address controller 114 sends an input control signal to the vector input switch 106 to designate a read address corresponding to a particular vector memory block to be read from the input vector memory 102. In response to the input control signal from the address controller 114, the vector input switch 106 retrieves the indicated vector memory block from the input vector memory 102 and transfers the vector memory block to one of the block transposition accelerators 108 and 110. In other words, the input control signal designates a read address to read the vector memory block from the input vector memory 102.

In one embodiment, the address controller 114 also interfaces with the block transposition accelerators 108 and 110. In general, the address controller 114 may control the input of vector memory blocks into each of the block transposition accelerators 108 and 110. The address controller 114 also may control the output of transposed vector memory blocks from each of the block transposition accelerators 108 and 110. In the depicted embodiment, the address controller 114 has two control lines going to each block transposition accelerator 108 and 110. These control lines control both the input and the output addresses used by the block transposition accelerators 108 and 110. Alternatively, other implementations may use fewer or more than two control lines from the address controller 114 to each block transposition accelerator 108 and 110.

In general, each of the block transposition accelerators 108 and 110 functions to receive an input vector memory block and to output a corresponding transposed vector memory block. More specifically, each block transposition accelerator 108 and 110 reads a vector of a block of data within the vector memory array and writes a transposition of the vector of the block of data to the output vector memory 104. In coordination with the address controller 114, the block transposition accelerators 108 and 110 may access the vector memory blocks within the input vector memory 102 according to a vector access order.

Figure 7:
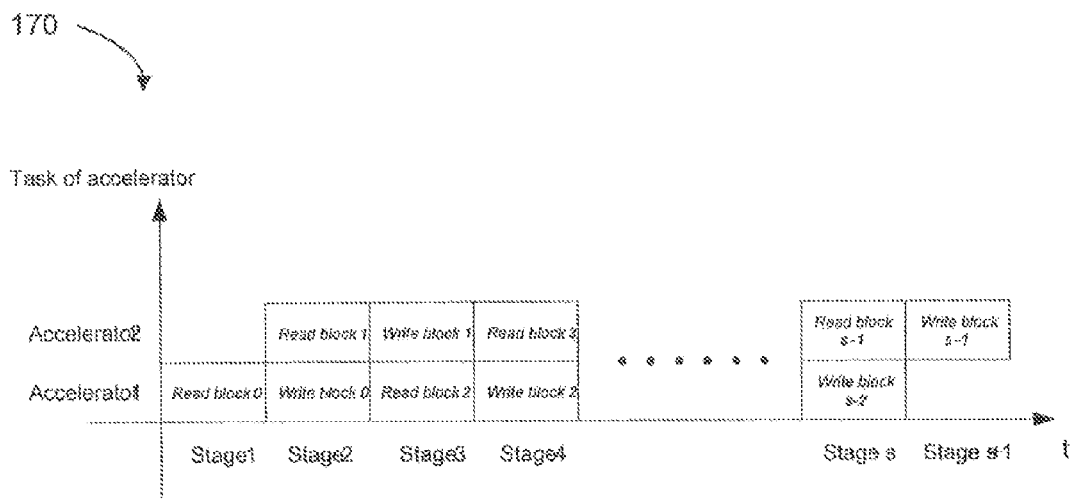
FIG. 7 depicts a schematic timing diagram of one embodiment of a vector transposition process for the vector transposition architecture of FIG. 3.

Additionally, the address controller 114 may coordinate successive read and write operations by the block transposition accelerators 108 and 110. In one embodiment, the address controller 114 alternates read and write operations for the block transposition accelerators 108 and 110 so that one of the block transposition accelerators (e.g., the block transposition accelerator 110) reads a subsequent vector memory block from the input vector memory 102 while the other block transposition accelerator (e.g., the block transposition accelerator 108) writes a transposed vector memory block for a previous vector memory block to the output vector memory 104, and vice versa. In this way, the address controller 114 coordinates continuous reading and writing operations while alternating between the first and second block transposition accelerators 108 and 110. In other words, the first and second block transposition accelerators 108 and 110 work successively in complementary phases on neighboring vector memory blocks to transpose a vector memory array from the input vector memory 102. An exemplary timing diagram of this alternating transposition process is shown in FIG. 7 and described in more detail below.

In one embodiment, the vector output switch 112 is a simple switch circuit, similar to the vector input switch 106, under the control of the address controller 114. The address controller 114 sends an output control signal to the vector output switch 112 to designate a write address corresponding to a particular target address of the output vector memory 104. In response to the output control signal from the address controller 114, the vector output switch 112 writes the transposed vector memory block from one of the block transposition accelerators 108 and 110 into the output vector memory 104. In other words, the output control signal designates a write address to store the transposition of the vector memory block in the output vector memory 104.

In the described embodiment, the pair of block transposition accelerators 108 and 110 is responsible for the execution of regular vector operations with very high efficiency. However, the size of the block transposition accelerators 108 and 110 may be limited for cost and/or flexibility reasons. Nevertheless, the function of the block transposition accelerators 108 and 110 is simple—to transpose blocks of data with a certain size of, for example, W×W. Because the block transposition accelerators 108 and 110 are interim devices for data storage, it is not necessary to move data elements physically (i.e., to actually change the address of the data elements). Hence, the block transposition operations can be implemented through reading and writing data vectors in different orders, which can be realized much more efficiently than actual address change operations.

Figure 4:
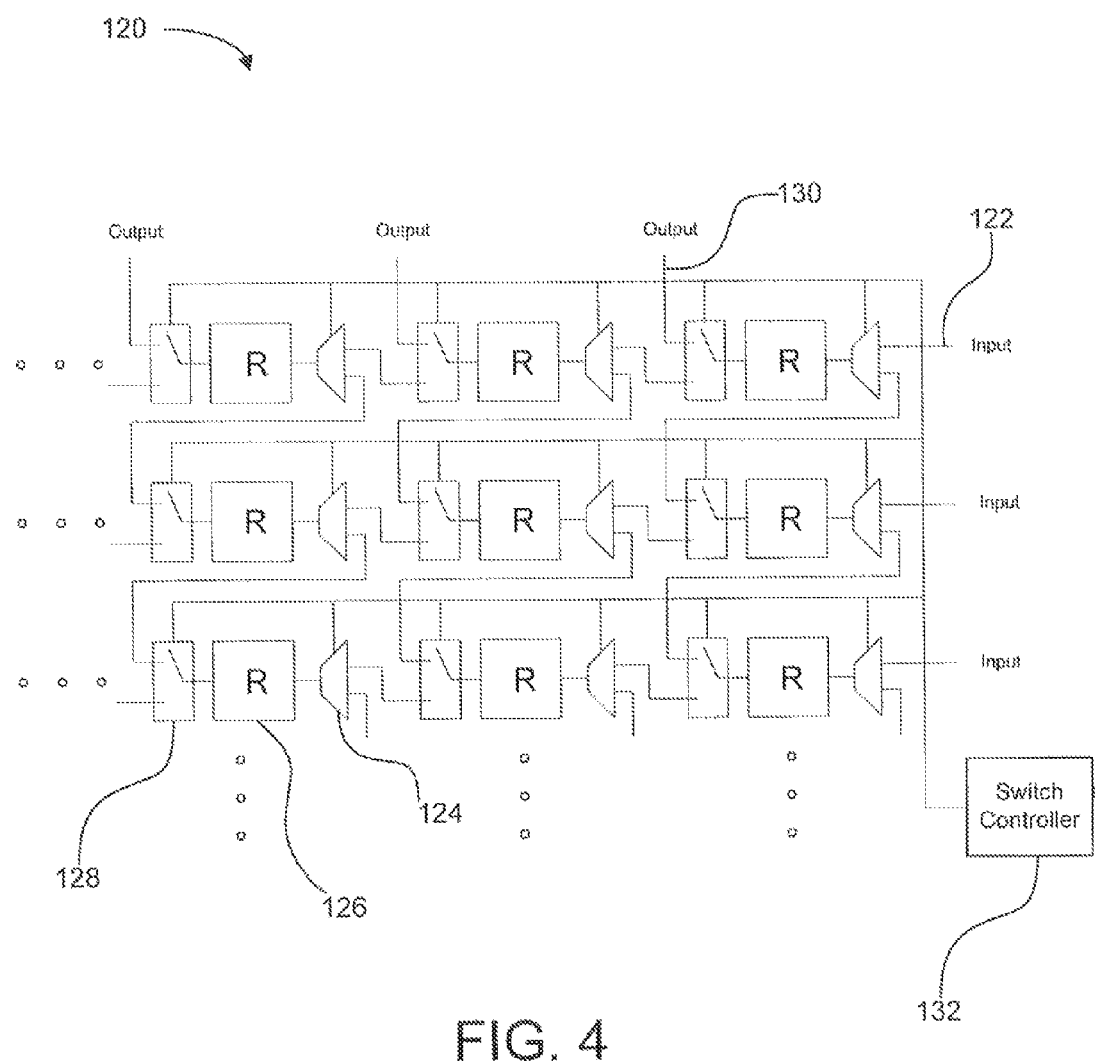
FIG. 4 depicts a schematic block diagram of one embodiment of a block transposition accelerator for use in the vector transposition architecture of FIG. 3.

FIG. 4 depicts a schematic block diagram of one embodiment of a block transposition accelerator 120 for use in the vector transposition architecture 100 of FIG. 3. The illustrated block transposition accelerator 120 is representative of either or both of the block transposition accelerators 108 and 110 shown in FIG. 3 and described above. However, other embodiments of the vector transposition architecture 100 may implement other types of block transposition accelerators.

In one embodiment, the block transposition accelerator 120 includes a set of switched register chains. Each switched register chain includes an input line 122. The input line 122 is connected to a series of multiplexers 124, registers 126, and output switches 128 with corresponding output lines 130. A switch controller 132 controls the multiplexers 124 and the output switches 128. In one embodiment, the switch controller 132 receives control signals from the address controller 114 of the vector memory architecture 100. In general, a vector memory block is read into the columns of the switched register chains, and the transposition of the vector memory block is read out of the rows of the switched register chains.

More specifically, the block transposition accelerator 120 includes a set of register chains with a particular switcher-controlled inter-connection. When the block transposition accelerator 120 operates in the input mode, W data elements are read concurrently per cycle into the input column of the block transposition accelerator 120. The data elements are shifted by one column (e.g., to the left) each cycle, until an entire memory vector block is stored in the registers 126 of the block transposition accelerator 120. In one embodiment, the output switches 128 shifts the vector data to adjacent registers 126 in response to a switch control signal from the switch controller 132.

When the block transposition accelerator 120 operates in the output mode, W data elements are written concurrently per cycle out of the output row of the block transposition accelerator 120. Additionally, the register inter-connections are changed by the switch control signals from the switch controller 132. In particular, the output switches 128 and the multiplexers 124 are controlled to shift the data elements row by row (e.g., upwards) towards the output lines 130. Hence, the data elements are read into the block transposition accelerator 120 along a first dimension (e.g., shifted horizontally by columns from the input lines 122) and are written out of the block transposition accelerator 120 along a second dimension (e.g., shifted vertically by rows to the output lines 130). In this way, a vector memory block of size W×W can be read into the block transposition accelerator 120 over a period of W cycles, and a transposition of the vector memory block can be written out at the block transposition accelerator 120 over a subsequent period of W cycles.

By using the block transposition accelerator 120 to transpose a vector memory block, as described herein, there is little or no overhead for data rearrangement to store the transposed vector memory block in the output vector memory 104. Additionally, the read and write operations are fully vector-based. In some embodiments, there is no zero padding or element masking in the data access operations. Thus, embodiments of the block transposition accelerator 120 allow the vector processing architecture 100 to operate at a relatively high efficiency or a maximum efficiency.

Furthermore, the size dimensions of the block transposition accelerator 120 may influence the overall efficiency and flexibility of the vector transposition architecture 100. In one embodiment, the block transposition accelerator 120 may be implemented with dimensions that are equal to the instinctive vector width of the vector processing architecture 100. In other words, the dimension, W, of the block transposition accelerator 120 equals the instinctive vector width, L, of the vector processing architecture 100 (i.e., W=L). This implementation allows a larger vector memory array (e.g., a vector memory array with dimensions greater than the instinctive vector width, L) to be processed in a manner compatible with the native bus width (i.e., L) of the vector processing architecture 100.

Figure 5:
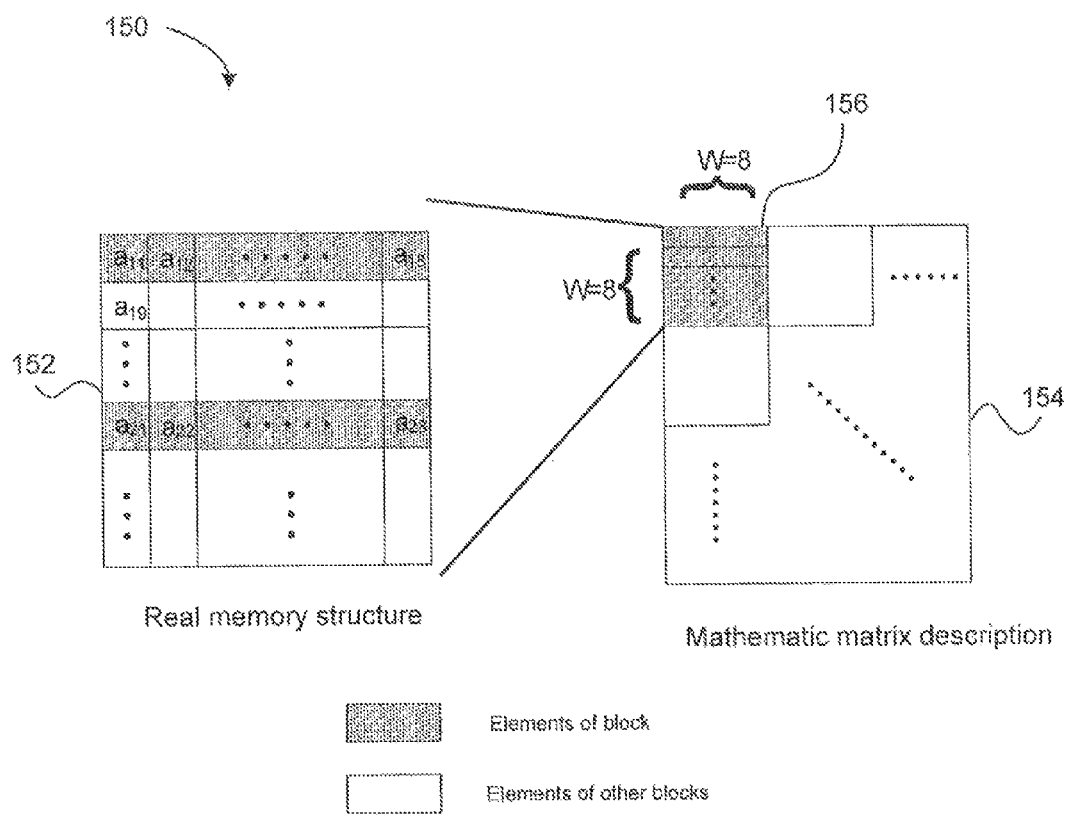
FIG. 5 depicts a schematic block diagram of one embodiment of a vector address correlation between a real memory structure and a mathematical matrix description.

FIG. 5 depicts a schematic block diagram of one embodiment of a vector address correlation 150 between a real memory structure 152 and a mathematical matrix description 154. As described above, the address controller 114 manages the order of vector accessing in the input vector memory 102 and the output vector memory 104. However, in the actual vector memory, the addresses of the individual data elements are not necessarily successive since the dimensions of the vector memory array may be different than the instinctive vector width, L, of the vector processing architecture 100.

The depicted real memory structure 152 illustrates an example of nonconsecutive vector addresses corresponding to a vector memory block 156 of the mathematical matrix description 154. As shown, the first eight elements of the first row (i.e., $a_{11}$ through $a_{18}$) of the mathematical matrix description 154 are not adjacent in the real memory structure 152 to the first eight elements of the second row (i.e., $a_{21}$ through $a_{28}$) of the mathematical matrix description 154. Nevertheless, the address span of adjacent vectors may be identical in each vector memory block, which can provide convenience for the circuit realization. In some embodiments, the start addresses of the matrix blocks are also regular, except for blocks in which the dimension of the matrix is not an integer multiple of the instinctive vector width, L, of the vector processing architecture 100. Additionally, the "in-block" vector access (i.e., a vector access within a matrix block) has the same address span in both read and write modes. The start addresses of matrix blocks may be different in many cases, except for blocks in a data line. For this reason, in some embodiments, the address count circuits may be switched between read and write modes for block start addresses only.

Figure 6A:
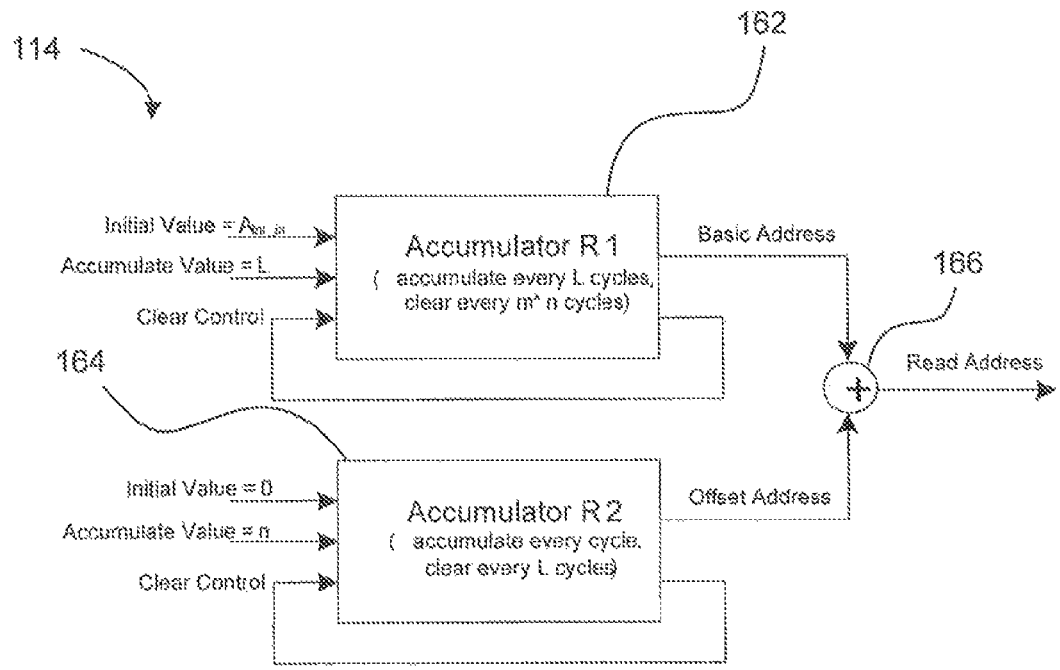
FIG. 6A depicts a schematic block diagram of one embodiment of a read implementation of the address controller of the vector transposition architecture of FIG. 3.

FIG. 6A depicts a schematic block diagram of one embodiment of a read implementation of the address controller 114 of the vector transposition architecture 100 of FIG. 3. The illustrated address controller 114 includes a first accumulator 162 and a second accumulator 164, as well as an adder 166. Although the depicted address controller 114 includes several functional blocks described herein, other embodiments of the address controller 114 may include fewer or more functional blocks to implement more or less functionality.

In one embodiment, the first accumulator 162 generates a basic address, $S_{basic\_address}$, and the second accumulator 164 generates an offset address, $S_{offset}$. However, the manner in which the first and second accumulators 162 and 164 generate the basic address and the offset address may differ depending on whether the address controller 114 is operating in a read mode or a write mode. For convenience, the accumulators 162 and 164 are designated as "R1" and "R2" in the read mode and "W1" and "W2" in the write mode. Regardless of the operating mode of the address controller 114, the adder 166 adds the basic address from the first accumulator 162 with the offset address from the second accumulator 164 to generate the corresponding read or write address.

As mentioned above, the vector translation process for the vector memory array includes a series of regular processing operations through each vector memory block. Although the processing of each vector memory block may be identical or substantially similar, the start address of each vector memory block is different within the input vector memory 102, so the address controller 114 generates different read addresses for each vector memory block within the vector memory array.

In the read mode, the first accumulator 162 receives an initial value, $A_{int\_in}$, as input and accumulates every L cycles, where L represents an accumulation value. The first accumulator 162 uses these inputs to generate the basic address, and clears every m*n cycles, where n represents an accumulation value for the second accumulator 164 in the read mode, and m represents an accumulation value for the second accumulator 164 and the write mode. The second accumulator 164 generates the offset address in the read mode based on an initial value and the accumulation value n. The second accumulator 164 clears every L cycles.

Figure 6B:
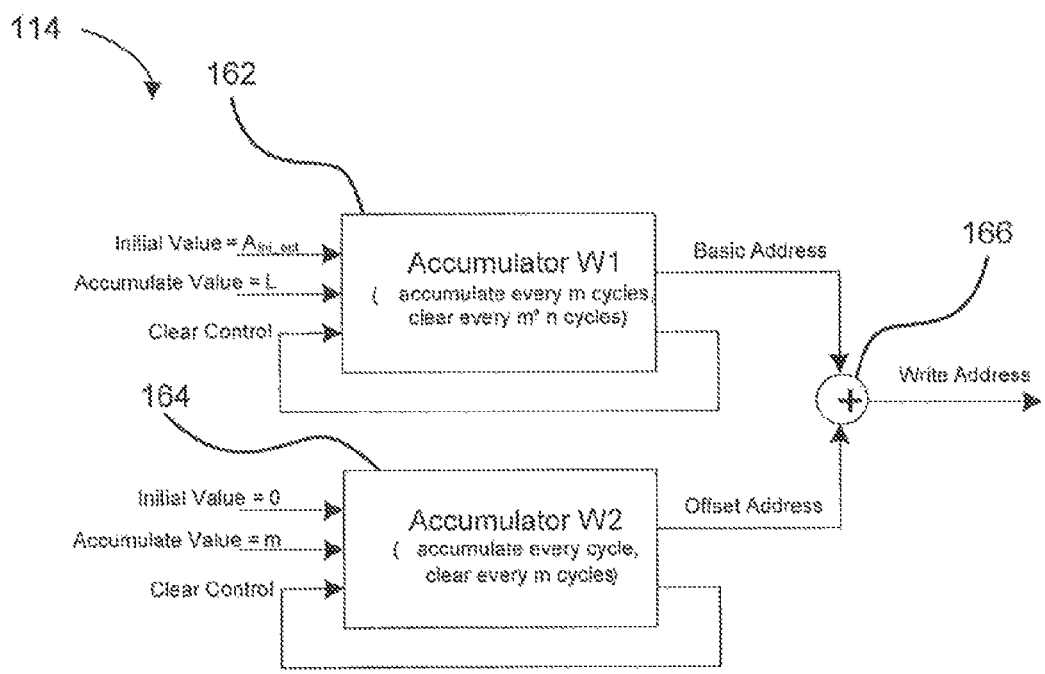
FIG. 6B depicts a schematic block diagram of one embodiment of a write implementation of the address controller of the vector transposition architecture of FIG. 3.

FIG. 6B depicts a schematic block diagram of one embodiment of a write implementation of the address controller 114 of the vector transposition architecture 100 of FIG. 3. In the write mode, the first accumulator 162 receives an initial value, $A_{ini\_out}$, as input and accumulates every m cycles to generate the basic address. The first accumulator 162 clears every m*n cycles. The second accumulator 164 generates the offset address in the write mode based on an initial value and the accumulation value m. The second accumulator 164 clears every m cycles.

FIG. 7 depicts a schematic timing diagram 170 of one embodiment of a vector transposition process for the vector transposition architecture 100 of FIG. 3. In one embodiment, the vector transposition process is subdivided into stages, and the block transposition accelerators 108 and 110 alternate between reading and writing modes so that consecutive processing of vector memory blocks can be at least partially executed in parallel. By scheduling the pair of block transposition accelerators 108 and 110, the processing time for the overall vector transposition process can be reduced, compared with conventional vector transposition techniques. For convenience, the vector memory array is assumed to be separated into s blocks, which are designated as blocks 0 through s-1.

In the first stage, the first block transposition accelerator 108 (i.e., "Accelerator 1") reads a vector of block 0 from the input vector memory 102. As one example, the first stage may have a duration of approximately W cycles, assuming each vector memory block has dimensions of W×W elements. During this first stage, the address controller 114 operates Accelerator 1 in the read mode, and the second block transposition accelerator 110 (i.e., "Accelerator 2") is idle.

In the second stage, Accelerator 1 writes out the transposed vector memory block, as described above, for block 0 to the output vector memory 104. The address controller 114 operates Accelerator 1 in the write mode during this stage. At the same time, the address controller 114 operates Accelerator 2 in the read mode to read in a vector of block 1 from the input vector memory 102. In this way, Accelerator 1 is able to write a transposed vector memory block for block 0 to the output vector memory 104 while Accelerator 2 reads a new vector memory block for block 1 from the input vector memory 102.

During the third stage, Accelerator 2 operates in the write mode to write out a transposed vector memory block for block 1 to the output vector memory 104. During this stage, Accelerator 1 operates in the read mode to read in a vector of block 2 from the input vector memory 102. In this way, Accelerator 2 is able to write a transposed vector memory block for block 1 to the output vector memory 104, while Accelerator 1 reads a new vector memory block for block 2 from the input vector memory 102.

The address controller 114 continues to coordinate in a similar manner with Accelerator 1 and Accelerator 2 to work successively in complementary phases on neighboring blocks of the vector memory array, until all of the transposed vector memory blocks have been written to the output vector memory 104. During the final stage, when Accelerator 2 operates in the write mode for block s-1, Accelerator 1 is idle.

Figure 8:
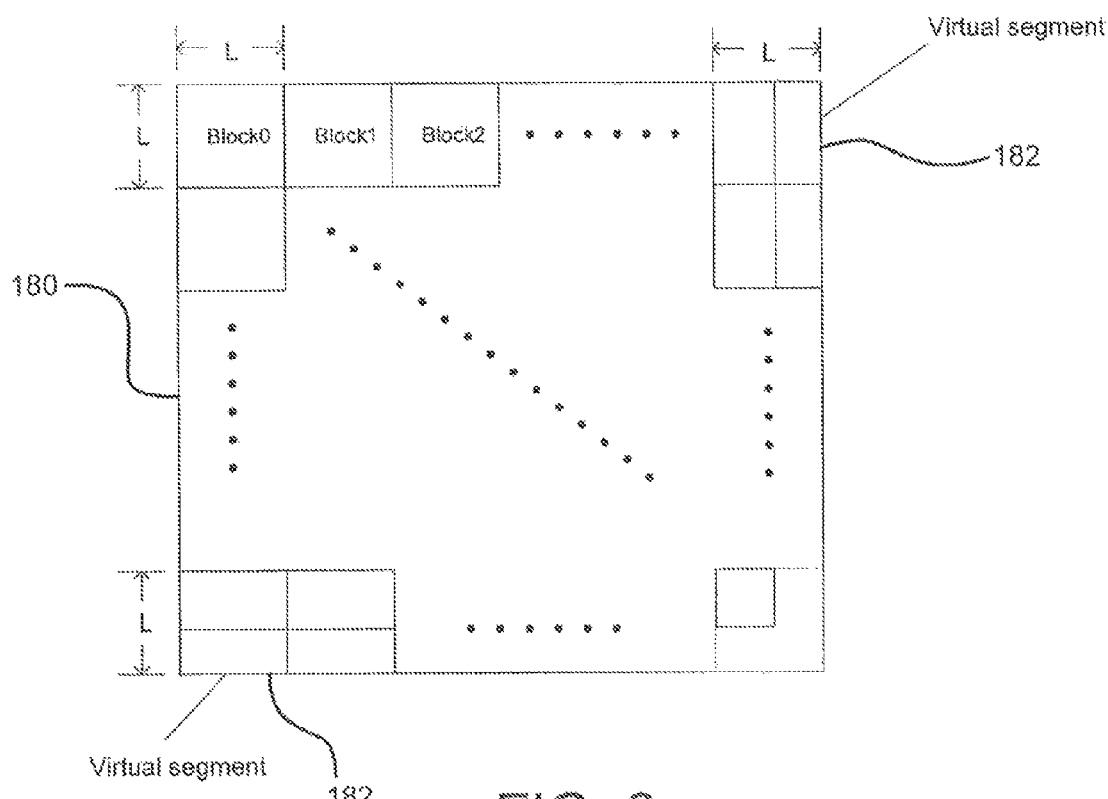
FIG. 8 depicts a schematic block diagram of one embodiment of a vector memory array with appended virtual segments.

FIG. 8 depicts a schematic block diagram of one embodiment of a vector memory array 180 with appended virtual segments 182. As explained above, when the dimensions of the vector memory array 180 are not an integer multiple of the instinctive vector width, L, of the vector processing architecture 100, one or more virtual segments 182 may be appended to the vector memory array 180 to simplify the processing at the block transposition accelerators 108 and 110. In other words, when the vector memory array 180 has a width which is different from the instinctive vector width, L, of the corresponding vector processing architecture 100, the block transposition accelerators 108 and 110 implement a plurality of virtual segments 182 which, when appended to the vector memory array 180, bring the width of the vector memory array 180 to an integer-based multiple of the instinctive vector width, L, of the corresponding vector processing architecture 100. This allows the block transposition accelerators 108 and 110 to mask a vector operation of a virtual segment of the plurality of virtual segments during a vector write stage to write the transposition of the vector of the block of data to the output vector memory 104. Accordingly, the block transposition accelerators 108 and 110 read these special blocks with the virtual, or padding, segments 182, and process the virtual segments 182 as part of the normal vector memory block. During the vector write stage, a masked vector operation is used to only change certain memory elements, excluding the memory elements corresponding to the masked elements.

Figure 9:
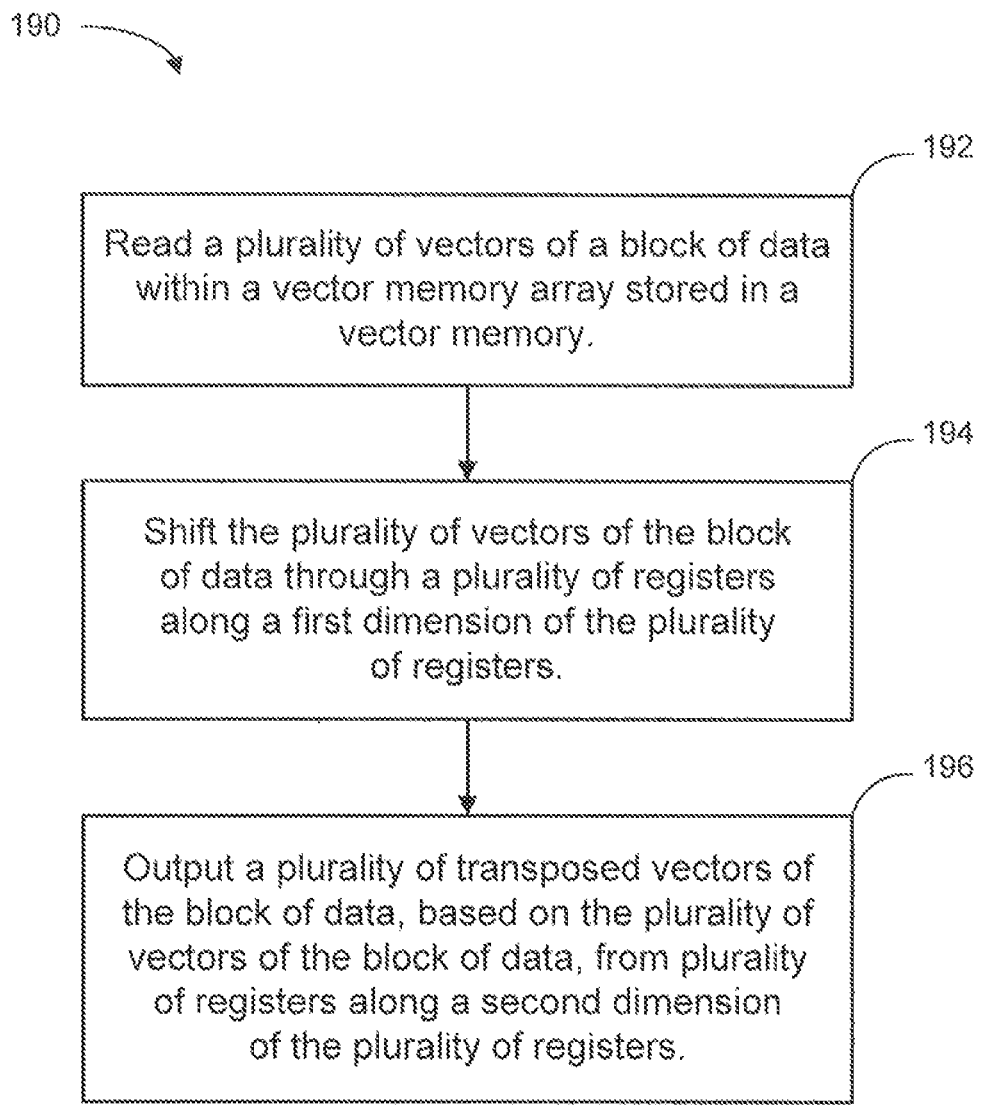
FIG. 9 depicts a schematic flow chart diagram of one embodiment of a method for transposing a vector memory array within the vector transposition architecture of FIG. 3.

FIG. 9 depicts a schematic flow chart diagram of one embodiment of a method 190 for transposing a vector memory array within the vector transposition architecture 100 of FIG. 3. Although the vector transposition method 190 is described in conjunction with the vector transposition architecture 100 of FIG. 3, other embodiments of the vector transposition method 190 may be implemented with other vector transposition architectures.

At block 192, one of the block transposition accelerators 108 and 110 reads a plurality of vectors of a block of data within a vector memory array stored in the input vector memory 102. At block 194, the same block transposition accelerator 108 or 110 shifts the plurality of vectors of the block of data through a plurality of registers 126 along a first dimension of the plurality of registers 126. At block 196, the same block transposition accelerator 108 or 110 outputs a plurality of transposed vectors of the block of data from the plurality of registers 126 along a second dimension of the plurality of registers 126. The transposed vectors are based on the vectors of the block of data from the input vector memory 102. The depicted vector transposition method 190 then ends.

In one embodiment, the transposed vectors are written to the output vector memory 104. In some embodiments, the vector transposition method 190 also includes reading one or more additional blocks of data from the input vector memory 102 and generating corresponding transposed vectors to write to the output vector memory 104. In some embodiments, the vector transposition method 190 also includes appending a plurality of virtual segments 182 to the vector memory array in response to a determination that the vector memory array has a width which is different from an instinctive vector width, L, of the vector processing architecture 100. In embodiments which use the virtual segments 182, the vector transposition method 190 also includes masking a vector operation of a virtual segment 182 during a vector write stage to write a transposed vector to the output vector memory 104.

As an exemplary comparison with conventional transposition techniques, Table 1 provides a calculation of approximate cycles for a 256.times.256 memory array transposition by various methods and architectures. From the number comparison, a processing advantage of the proposed architecture can be seen.

TABLE 1

Cycles for a 256 × 256 memory array transposition.

| Method/ Architecture | Conventional vector architecture | Scalar method/ architecture | Proposed vector architecture |
|---|---|---|---|
| Cycles | 204,800 | 196,608 | 4,096 |

Embodiments of the vector processing architecture 100 and the vector transposition method 190 are related to re-configurable Digital Signal Processing (DSP) architectures, especially to corresponding architectures and/or platforms based on Software Defined Radio (SDR). Additionally, embodiments of the method 190 and the corresponding architecture 100 can be broadly applied to many communication and broadcasting systems, including 2G, 3G/B3G cellular systems, 802.11 series, Wi-Max, Digital TV-T/H, and other kinds of applications in multi-mode systems.

It should also be noted that at least some of the operations for the method 190 and vector processing architecture 100 may be implemented using software instructions stored on a computer useable storage medium for execution by a computer. As an example, an embodiment of a computer program product includes a computer useable storage medium to store a computer readable program that, when executed on a computer, causes the computer to perform operations, as described above.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a Random Access Memory (RAM), a Read-Only Memory (ROM), a rigid magnetic disk, and an optical disk. Current examples of optical disks include a Compact Disk with Read-Only Memory (CD-ROM), a Compact Disk with Read/Write (CD-R/W), a Digital Video Disk (DVD), and High-Definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for vector memory array transposition, the system comprising:
a vector memory to store a vector memory array;
a block transposition accelerator coupled to the vector memory, the block transposition accelerator configured to firstly read vectors of a block of data by shifting the vectors into the vector memory array along a first dimension such that each vector is shifted serially into the vector memory in the same direction as the first dimension and to secondly write a transposition of the vectors by shifting the transposition of the vectors out of the vector memory along a second dimension such that each transposed vector is shifted serially out of the vector memory in the same direction as the second dimension, wherein the second dimension is perpendicular to the first dimension in the vector memory array;
an address controller coupled to the block transposition accelerator, the address controller configured to determine a vector access order,
wherein the block transposition accelerator is configured to access the vector of the block of data within the vector memory array according to the vector access order; and
wherein the vector memory is partitioned into a set of blocks comprising the block of data and the second block of data, and wherein each block of data of the set of blocks has a uniform block size.

2. A system for vector memory array transposition, the system comprising:
a vector memory to store a vector memory array;
a block transposition accelerator coupled to the vector memory, the block transposition accelerator configured to firstly read vectors of a block of data by shifting the vectors into the vector memory array along a first dimension such that each vector is shifted serially into the vector memory in the same direction as the first dimension and to secondly write a transposition of the vectors by shifting the transposition of the vectors out of the vector memory along a second dimension such that each transposed vector is shifted serially out of the vector memory in the same direction as the second dimension, wherein the second dimension is perpendicular to the first dimension in the vector memory array;

a vector input switch coupled to the block transposition accelerator; and an address controller coupled to the block transposition accelerator, the address controller configured to determine a vector access order, wherein the block transposition accelerator is configured to access the vector of the block of data within the vector memory array according to the vector access order; and wherein the vector input switch is configured to input the vector of the block of data from the vector memory to the block transposition accelerator in response to a read command from the block transposition accelerator.

3. The system in accordance with claim 2, further comprising a vector output switch coupled to the block transposition accelerator, wherein the vector output switch is configured to output the transposition of the vector from the block transposition accelerator to the vector memory in response to a write command from the block transposition accelerator.

4. The system in accordance with claim 3 wherein the address controller is further configured to send an input control signal to the vector input switch and an output control signal to the vector output switch, wherein the input control signal designates a read address corresponding to the vector of the block of data within the vector memory, and wherein the output control signal designates a write address to store the transposition of the vector of the block of data in the vector memory.

5. A system for vector memory array transposition, the system comprising:

a vector memory to store a vector memory array;

a block transposition accelerator coupled to the vector memory, the block transposition accelerator configured to firstly read vectors of a block of data by shifting the vectors into the vector memory array along a first dimension such that each vector is shifted serially into the vector memory in the same direction as the first dimension and to secondly write a transposition of the vectors by shifting the transposition of the vectors out of the vector memory along a second dimension such that each transposed vector is shifted serially out of the vector memory in the same direction as the second dimension, wherein the second dimension is perpendicular to the first dimension in the vector memory array; and an address controller coupled to the block transposition accelerator, the address controller configured to determine a vector access order, wherein the block transposition accelerator is configured to access the vector of the block of data within the vector memory array according to the vector access order; and wherein the block transposition accelerator comprises a set of switched register chains, and wherein the vector is read into a column of the switched register chains, and the transposition of the vector is read out of the switched register chains.

6. The system in accordance with claim 5, wherein the set of switched register chains has a dimension which equals an instinctive vector width of a corresponding vector processing architecture.

7. The system in accordance with claim 6, wherein the vector memory array has a width which is different from the instinctive vector width of the corresponding vector processing architecture, and wherein the block transposition accelerator is further configured to implement a plurality of virtual segments which, when appended to the vector memory array, bring the width of the vector memory array to an integer-based multiple of the instinctive vector width of the corresponding vector processing architecture.

8. The system in accordance with claim 7, wherein the block transposition accelerator is further configured to mask a vector operation of a virtual segment of the plurality of virtual segments during a vector write stage to write the transposition of the vector of the block of data to the vector memory.

9. The system in accordance with claim 5, further comprising a switch controller coupled to the block transposition accelerator, the switch controller to generate a switch control signal to control a plurality of individual switches coupled to a plurality of individual registers within the switched register chains, wherein the plurality of individual switches are configured to shift vector data stored in the plurality of individual registers in response to the switch control signal.

10. The system in accordance with claim 5 wherein the address controller comprises first and second accumulators coupled to an adder, and wherein the first accumulator is configured to generate a basic address and the second accumulator is configured to generate an offset address, and the adder is configured to combine the basic address and the offset address.

11. A method for transposing a vector memory array, the method comprising:

reading a plurality of vectors of a block of data within the vector memory array stored in a vector memory;

appending a plurality of virtual segments to the vector memory array in response to a determination that the vector memory array has a width which is different from an instinctive vector width of a corresponding vector processing architecture reading, by a first block transposition accelerator in input mode, the plurality of vectors of the block of data into the first block transposition accelerator by separately shifting each one of the plurality of vectors of the block of data serially into separate rows of a plurality of matrix registers in a first direction; and outputting immediately after reading, by the first block transposition accelerator in output mode, a plurality of transposed vectors of the block of data serially from columns of the plurality of matrix registers that are perpendicular to the rows, wherein the plurality of transposed vectors are based on the plurality of vectors of block data.

12. The method in accordance with claim 11, further comprising masking a vector operation of a virtual segment of the plurality of virtual segments during a vector write stage to write a transposed vector to the vector memory.

* * * * *